(12) United States Patent
Hiroshima (10) Patent No.: US 7,617,897 B2
(45) Date of Patent: Nov. 17, 2009

(54) VEHICLE ENGINE COOLING SYSTEM

(75) Inventor: Kazuo Hiroshima, Toyota (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 483 days.

(21) Appl. No.: 11/402,802

(22) Filed: Apr. 13, 2006

(65) Prior Publication Data

US 2006/0231047 A1    Oct. 19, 2006

(30) Foreign Application Priority Data

Apr. 15, 2005    (JP)    ............ P2005-118844

(51) Int. Cl.
*B60K 11/04*    (2006.01)
(52) U.S. Cl. .................... 180/68.4; 180/68.6
(58) Field of Classification Search ............. 180/68.4, 180/68.6
See application file for complete search history.

(56) References Cited

U.S. PATENT DOCUMENTS

| | | | | |
|---|---|---|---|---|
| 657,684 | A * | 9/1900 | Vorreiter | 180/68.4 |
| 3,835,948 | A * | 9/1974 | Duclo | 180/190 |
| 3,901,335 | A * | 8/1975 | Johnson | 180/190 |
| 4,902,059 | A * | 2/1990 | Tritton | 293/117 |
| 5,167,294 | A * | 12/1992 | Gessinger | 180/190 |
| 5,232,066 | A * | 8/1993 | Schnelker | 180/190 |
| 6,059,061 | A * | 5/2000 | Economoff et al. | 180/68.1 |
| 6,109,217 | A * | 8/2000 | Hedlund et al. | 123/41.01 |
| 6,443,253 | B1 * | 9/2002 | Whitehead et al. | 180/68.1 |
| 6,505,696 | B1 * | 1/2003 | Prevost | 180/68.4 |
| 6,793,028 | B2 * | 9/2004 | Pack | 180/68.1 |
| 7,213,638 | B2 * | 5/2007 | Seiler et al. | 165/148 |
| 7,328,765 | B2 * | 2/2008 | Ebert et al. | 180/190 |
| 7,353,898 | B1 * | 4/2008 | Bates, Jr. | 180/68.1 |

FOREIGN PATENT DOCUMENTS

| | | |
|---|---|---|
| DE | 38 00 296-A 1 | 7/1989 |
| DE | 41 00 483-A 1 | 7/1992 |
| DE | 42 19 938-A 1 | 12/1992 |
| JP | 61-150822 A | 7/1986 |
| JP | 61-150824 A | 7/1986 |

* cited by examiner

*Primary Examiner*—Jeffrey J Restifo
(74) *Attorney, Agent, or Firm*—Birch, Stewart, Kolasch & Birch, LLP (57) ABSTRACT

A vehicle engine cooling system includes a cooling water circulation passage extending from an engine in an engine room and returning to the engine, at least a part of the cooling water circulation passage arranged to face a running wind flow space apart from the engine room. The cooling water circulation passage includes a forward cooling part disposed in a front portion of a vehicle body for receiving a running wind substantially perpendicularly includes a bent radiation pipe, and a floor-lower-face cooling part disposed on a lower face of a floor of the vehicle body for receiving the incoming wind includes a finned radiation pipe.

11 Claims, 6 Drawing Sheets

VEHICLE ENGINE COOLING SYSTEM

BACKGROUND OF THE INVENTION

1. Field of the Invention

The present invention relates to a vehicle engine cooling system for releasing the heat generated while an engine operates, to an air through a cooling water circulation system thereby to stabilize operation of the engine and to retain durability of the engine.

2. Description of the Related Art

Vehicles, particularly passenger cars, are categorized into a front engine type, in which the engine is mounted on the front side of the front wheel axles, a rear engine type, in which the engine is mounted on the back side of the rear wheel axles, and a midship type, in which the engine is mounted between the front and rear wheel axles. The front and rear engine types can provide large cabins so that they are adopted in a so-called "family car." The midship type is adopted in a special vehicle such as a sports car because the midship type is excellent in maneuverability such as turning ability although a cabin space is limited.

Here, the car-mounted engine generates heat when the engine operates. In order to prevent operation failures or early deterioration due to excessively high temperature of the engine components, there has been adopted an engine cooling system. The heat is carried out of the engine through cooling water in the cooling water circular system and releases the engine heat to the atmosphere.

In the engine cooling system of this kind, the heat absorbed by the cooling water in the engine body is guided to a heat exchanger, a radiator, arranged outside of the engine, and the heat in the heated cooling water is released to the atmosphere so that the cooling water temperature is lowered. The cooling water thus cooled is returned again to the engine body. No matter whether the vehicle is the front, rear or midship types, the radiator is generally disposed near the engine so that it can exchange the heat by guiding a running wind from the outside into the radiator through the running wind passage. However, the radiator of related art is formed into a ventilating thick plate shape by overlaying a number of thin pipes and radiator fins individually. This structure causes weight increase, cost increase or restriction in the freedom of the engine room layout.

JP-A-61-150822 discloses a cooling system, which the conventional radiator is excluded by forming the radiator into a panel shape, by constituting the panel-shaped radiator into a roof, and uses the heat-exchanging function of the panel-shaped radiator with the running wind. Moreover, JP-A-61-150824 discloses a cooling system, in which the conventional radiator is excluded by forming the radiator into a panel shape, by constituting the panel-shaped radiator into an engine hood, and by using the heat-exchanging function of the panel-shaped radiator with the running wind.

SUMMARY OF THE INVENTION

In the radiator of the related art, the radiator disposed near the engine is connected to the engine through a rubber hose, and the heat radiating function in the cooling system of the vehicle is performed mostly by the radiator but hardly at the pipe portion of the rubber hose or the like between the radiator and the engine. In the cooling systems of the related art, the radiator is excluded and replaced by a separate panel-shaped radiator and the panel-shaped radiator is attached in place of the outer wall members of the vehicle body. On the other hand, the cooling water circulation passage has to be formed while retaining the intrinsic shapes of the individual outer wall members of the vehicle body. This necessity raises problems in complexity of the structure and complexity of the mounting works, and the rise in the cost.

Here, it is conceivable that the length of the cooling water circulation system of the engine is sufficiently long. Taking advantage of the long length of the cooling water circulation system, the cooling system may be constituted only of a structure of simple metallic pipes or the like. If the heat radiation structure of those metallic pipes is sufficiently long, it is estimated to attain the cooling effect corresponding to that length.

Unlike the front engine vehicle, which is easy to face the running wind, especially for the rear engine or the midship type engine, it is sufficiently possible to retain the length of the pipe and the part facing the running wind by arranging a part of their cooling water circulation system on the front side of the vehicle body. It is, therefore, estimated that the sufficient cooling effect can be obtained only by the heat radiation from the pipe portions of the cooling water circulation system.

The present invention has been made in view of above circumstances and provides a vehicle engine cooling system. According to an aspect of the invention, the vehicle engine cooling system can lower the cost easily by adopting a single pipe structure and a heat radiation structure arranged relatively long in a part to receive the running wind.

According to a first aspect of the invention, there is provided a vehicle engine cooling system including: a cooling water circulation passage extending from an engine in an engine room and returning to the engine, at least a part of the cooling water circulation passage being arranged to face a running wind flow space apart from the engine room. The cooling water circulation passage includes: a forward cooling part disposed in a front portion of a vehicle body for receiving a running wind substantially perpendicularly and includes a bent radiation pipe; and a floor-lower-face cooling part disposed on a lower face of a floor of the vehicle body for receiving the incoming wind and includes a finned radiation pipe.

According to a second aspect of the invention, there is provided the vehicle engine cooling system according to the first aspect, wherein the cooling water circulation passage further includes: a deck cooling part including a deck radiation pipe passing an inside of a deck portion of the vehicle body.

According to a third aspect of the invention there is provided the vehicle engine cooling system according to the first aspect, wherein the cooling water circulation passage includes a metallic radiation pipe at a portion other than at least one of the forward cooling part, the floor-lower-face cooling part and the deck cooling part.

According to a fourth aspect of the invention, there is provided the vehicle engine cooling system according to the first aspect, wherein the engine room is arranged in a middle portion or in a back portion of the vehicle body.

According to a fifth aspect of the invention, there is provided the vehicle engine cooling system according to the first aspect, wherein the bent radiation pipe is arranged in a front space of an air conditioner condenser arranged in a front hood room in the front portion of the vehicle body.

According to the configuration as set forth in the first aspect, the cooling water flows out of the engine in the engine room, circulates in the running wind flow space apart from the engine room and returns to the engine. At this time, the effect to achieve a sufficient cooling effect of the cooling water can be attained by a forward cooling part including the bent radiation pipe for receiving the running wind frontally and by a floor-lower-face cooling part including the finned radiation pipes for receiving the running wind on the lower face of the body floor. Moreover, the structure can be simplified by using the bent radiation pipe and the finned radiation pipes. Moreover, the bent radiation pipe and the finned radiation pipes are so easily bent as to adopt any shape so that the engine cooling system can take the cooling system layout which has been impossible for the radiator of the related art.

According to the configuration as set forth in the second aspect, the deck portion of the vehicle body forms a part of the running wind flow space so that the deck radiation pipe bypassing the inside of the deck portion can receive the running wind effectively to provide the sufficient cooling effect of the cooling water.

According to the configuration as set forth in the third aspect, the portions other than the forward cooling part, the floor-lower-face cooling parts and/or the deck cooling part are formed of the metallic radiation pipes so that the engine cooling system can attain a more sufficient cooling effect of the cooling water.

According to the configuration as set forth in the fourth aspect, the cooling water circulation passage is extended from the middle portion or the rear portion of the vehicle body so that parts of the cooling water circulation passage are arranged in the forward cooling part, the floor-lower-face cooling parts and/or the deck cooling part. As a result, the cooling water circulation passage can be made relatively long to attain a more sufficient cooling effect of the cooling water.

According to the configuration as set forth in fifth aspect, the bent radiation pipe is arranged in the front space of the air conditioner condenser so that it can easily receive not only the running wind but also a forced ventilation flow of the air conditioner condenser thereby to provide a more sufficient cooling effect of the cooling water.

BRIEF DESCRIPTION OF THE DRAWINGS

Embodiments of the present invention will be described in detail based on the following figures, wherein:

FIGS. 4A to 4C shows a finned radiation pipe to be used in outgoing and incoming floor-lower-face cooling parts in FIG. 1.

FIGS. 7A to 7C present explanatory diagrams of the connection structure of the bent radiation pipe to be used in the forward cooling part in FIG. 1; FIG. 7A is an explanatory diagram of the connection structure of the bent radiation pipe in FIG. 1.

DETAILED DESCRIPTION OF THE INVENTION

Figure 1:
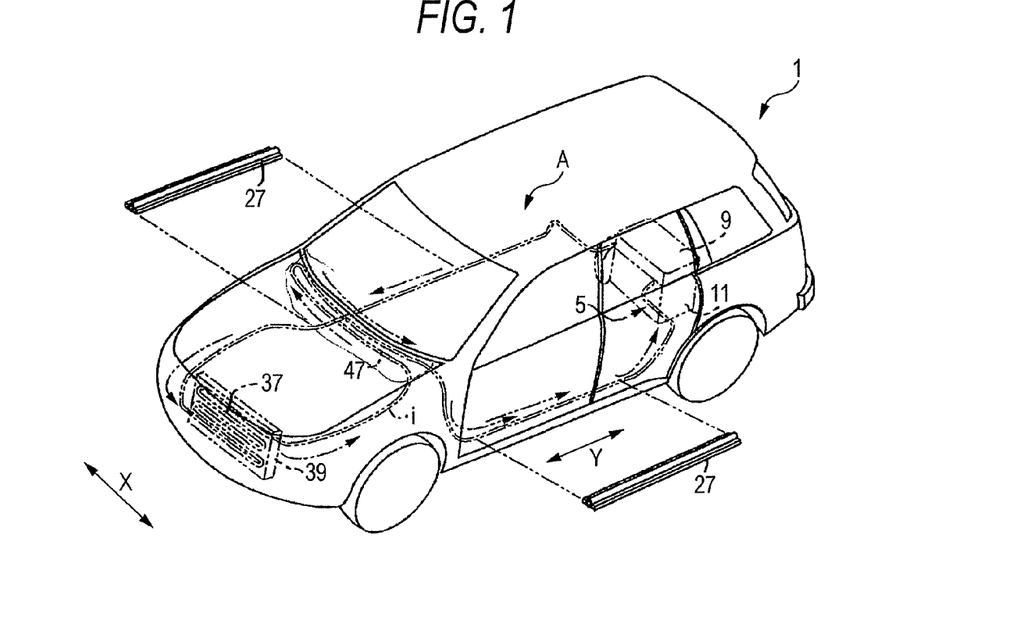
FIG. 1 is a schematic perspective view of a vehicle, which is provided with an engine cooling system according to one embodiment of the invention.
Figure 2:
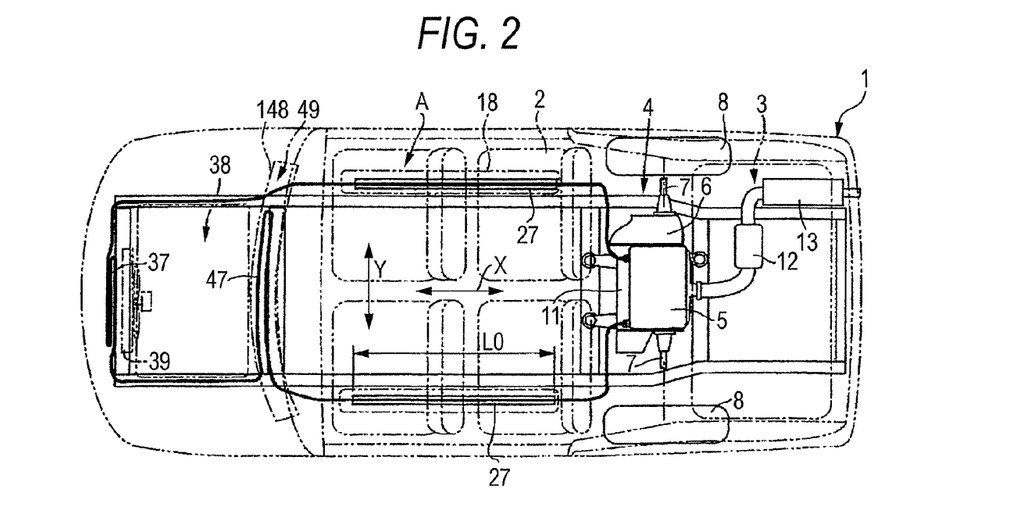
FIG. 2 is a schematic top plan view of the engine cooling system to be mounted on the vehicle of FIG. 1.

FIGS. 1 and 2 show a vehicle 1, which is provided with an engine cooling system A according to an embodiment of the invention.

The vehicle 1 is a wagon car of a rear engine type, which is provided with a cargo room 3 at the back of rear seats 2 and in which a rear engine room 4 is arranged between the back of the rear seats and the cargo room 3.

In the rear engine room 4, there are arranged an engine 5, a clutch 6, and the not-shown transmission and differential, the outputs of which are transmitted through right and left rear wheel drive axles 7 to right and left rear wheels 8. The engine 5 is transverse mounted, in which a plurality of cylinders are arranged in series and which has its not-shown output shaft arranged in a width direction Y. As shown in FIGS. 1 and 2, moreover, the engine 5 is mounted in an upright position along the rear seats 2 and is arranged to have a cylinder head 9 a cylinder block 11. The clutch 6 is arranged adjacent to the cylinder block 11.

The engine 5 performs four-cycle combustion process while being fed with intake air by an intake system and with a fuel, and discharges the exhaust gas to the atmosphere so that it outputs the resultant driving force to the right and left rear wheel drive axles 7.

Figure 3:
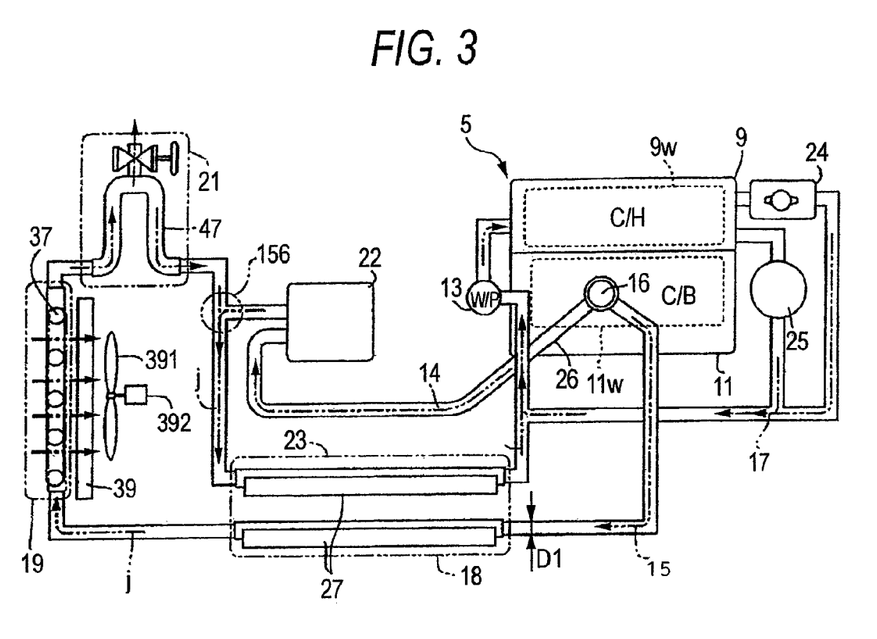
FIG. 3 is a pipe constitution diagram of a cooling water circulation system used by the engine cooling system of FIG. 1.

On the body of the engine 5, the vehicle engine cooling system A (hereinafter engine cooling system) is mounted, which makes the gist of the invention. In this engine cooling system A, as shown in FIG. 3, upper and lower water jackets $9w$ and $11w$ in the cylinder head 9 and the cylinder block 11 absorb the heat, as generated by the engine, with cooling water, and this cooling water having absorbed the heat circulates in a cooling water circulating system outside of the engine. The water is cooled during the circulation while releasing the heat to the atmosphere, and the cooled water is returned to the engine 5 so that it keeps the engine at a proper temperature thereby to maintain a stable engine operation.

The engine cooling system A includes a water pump 13 mounted in the engine body and driven by the engine drive force, a thermostat 16 for selectively switching the flow of the cooling water to a heating passage 14 or a main circulation passage 15 in accordance with the temperature of the cooling water, a warming promotion passage 17, an outgoing floor-lower-face cooling part 18, a forward cooling part 19 and a deck cooling part 21 arranged in the main circulation passage 15, and a heater 22 and an incoming floor-lower-face cooling part 23 arranged in the heating passage 14.

The warming promotion passage 17 includes a pipe of a relatively small diameter to feed the cooling water in a relatively small quantity out of the cylinder head 9, to guide the cooling water into a passage, in which a condenser tank 25 for a temporary residence and an ATF warmer 25 for warming a lubricant in the not-shown transmission are connected in parallel, and then return the cooling water to the water pump 13.

The main circulation passage 15 includes the outgoing and incoming floor-lower-face cooling parts 18 and 23 positioned on the front side of the rear engine room 4 in a longitudinal direction X and facing a running wind flow space, the forward cooling part 19, and the deck cooling part 21. The portions constituting those outgoing and incoming floor-lower-face cooling parts 18 and 23, forward cooling part 19 and deck cooling part 21, and the remaining main communication unit j are made of, for example, a metallic pipe having an external diameter D1 of 10 mm. As a result, the main circulation passage 15 is formed so that the cooling water flow at a sufficient flow rate thereby to improve the heat radiation effect all over the main circulation passage 15.

Figure 4A:
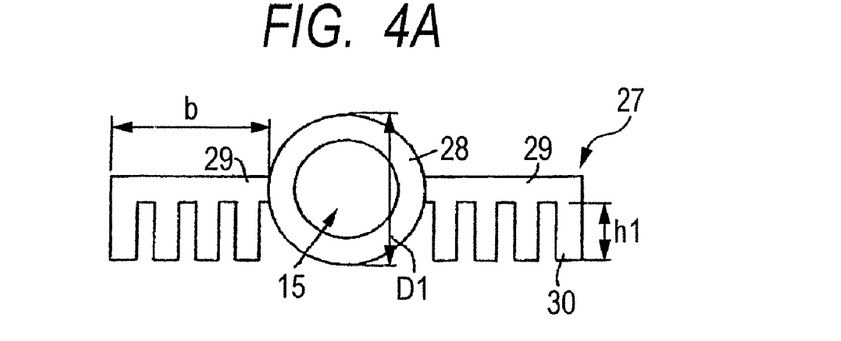
FIG. 4A is a front elevation of an end portion.
Figure 4B:
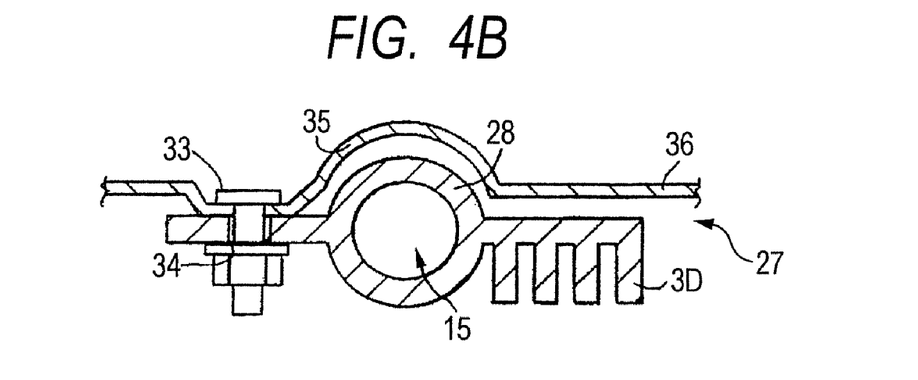
FIG. 4B is a sectional view of an essential portion.
Figure 4C:
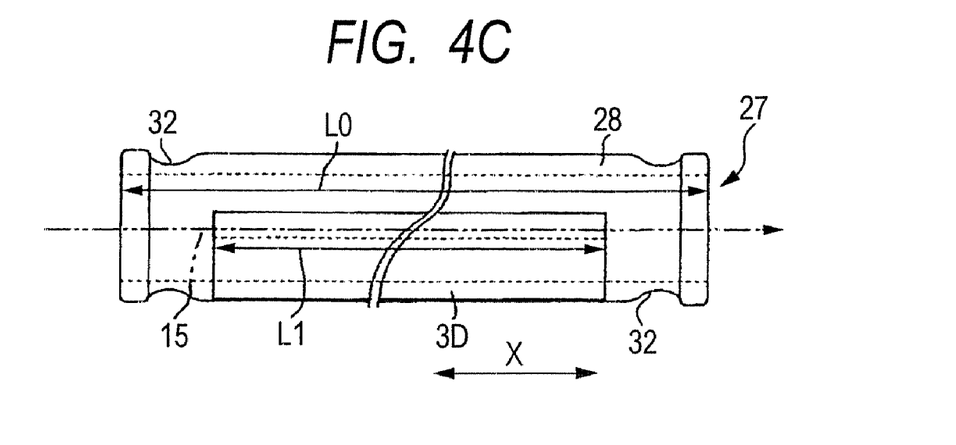
FIG. 4C is a cutaway side elevation.

The outgoing floor-lower-face cooling part 18 in the main circulation passage 15 includes finned radiation pipes 27. As shown in FIGS. 4A to 4C, the finned radiation pipes 27 include an extruded aluminum material and are mounted below the floor of the vehicle body as to have their longitudinal directions oriented in the longitudinal direction X of the vehicle.

The finned radiation pipe 27 is formed such that its main pipe 28 has an external diameter D1 equal to that of the main communication unit, and horizontal flanges 29 are so extended with a width b from the right and left side portions of the main pipe 28 by L1 which is slightly shorter than the length L0 of the main pipe 28. The horizontal flange 29 is equipped on its lower face with a plurality of vertical fins 30 of a predetermined height h1, which extend at an equal interval from each other and in parallel with the main pipe 28.

Figure 6:
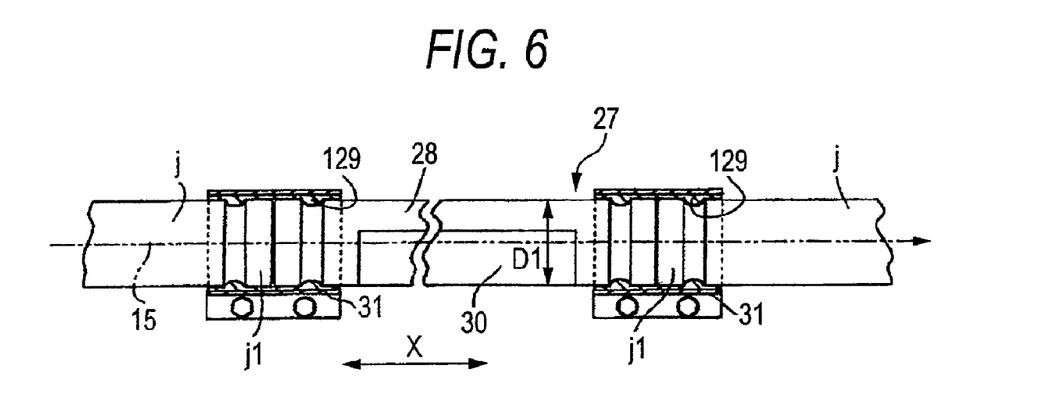
FIG. 6 is an explanatory view of a connection structure of a finned radiation pipe in FIG. 1.

As shown in FIG. 4C, moreover, annular recesses 32 are formed in the front and back ends of the main pipe 28 in the longitudinal direction X. As shown in FIG. 6, moreover, the annular recesses 32 are also formed in abutting end portions of the individual front and back main communication unit j to be brought into abutment against the front and back ends of the main pipe 28. Here, with the front and back ends of the main pipe 28 and the abutting end portions j1 of the individual main communication units j abutting each other, the individual abutting portions are integrally fastened and jointed by fastening belts 31 through sealing members 129.

Here, the finned radiation pipe 27 is formed of an extruded aluminum material. For a treatment after the extrusion, the vertical fins 30 are cut away at predetermined areas, as shown in FIG. 4B, to form mounting holes 34 for mounting stud bolts 33. These mounting holes 34 are formed at a plurality of portions of the finned radiation pipe 27 in the longitudinal direction. In the floor 36 of the vehicle, moreover, a main pipe fitting recess 35 is formed at a portion to face the main pipe 28 of the radiation pipe 27, and the stud bolts 33 for fastening the horizontal flanges 29 are also so arranged on the floor 36 as to protrude downward. In addition, the finned radiation pipe 27 is not limited to the above configuration but may be a pipe which includes at least one protrusion on an outer surface of the pipe.

The finned radiation pipes 27 forming that outgoing floor-lower-face cooling part 18 are easily fixed, when mounted, on the lower face of the floor 36 by inserting the mounting holes 34 onto the facing stud bolts 33 of the floor 36 and by fastening the stud bolts 33 with nuts, so that the finned radiation pipes 27 are arranged to face the running wind flow space.

Figure 5:
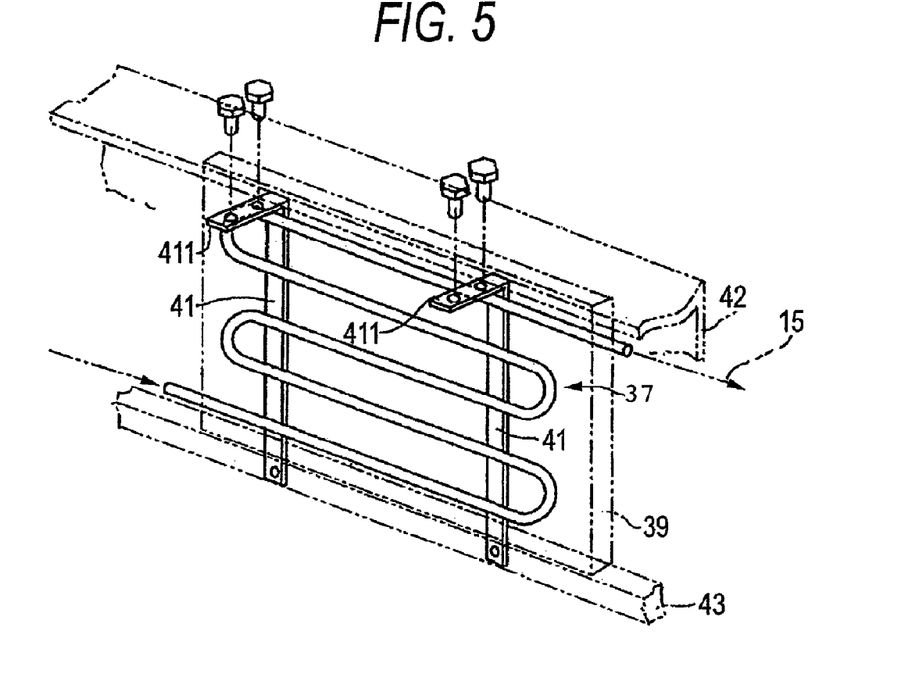
FIG. 5 is a perspective view of a bent radiation pipe to be used in a forward cooling part in FIG. 1.

As shown in FIGS. 1, 2 and 5, the forward cooling part 19 in the main circulation passage 15 includes a bent radiation pipe 37. This bent radiation pipe 37 is arranged at the front end of a front hood room 38 of the vehicle 1 in the transverse direction Y and just in front of the condenser 39 of an air conditioner or an ordinary equipment so that it faces the running wind flow space. Here, the condenser 39 is equipped with a fan 391 and a fan motor 392 facing each other, as shown in FIG. 3, so that it can feed the cooling wind from the front to the back at the forced cooling time of the condenser 39. The bent radiation pipe 37 is formed to have the external diameter D1 equal to that of the main communication unit j, and is so arranged in the transverse direction Y in parallel with the condenser 39 that it is bent as serpentine curve in a vertical direction. The bent radiation pipe 37 is fixed on a pair of right and left brackets 41 by means of not-shown stoppers. Moreover, the paired right and left brackets 41 are bent at their upper end portions to form bent portions 411, and are fastened at the upper end portions by bolts to a front upper bar 42 forming the body base and at their lower end portions by bolts to a front lower bar 43. In addition, the bent radiation pipe 37 is not limited to the above configuration but may be a pipe which is bent so that a direction of flow of the cooling water in the pipe is reversed at least one time.

Figure 7A:
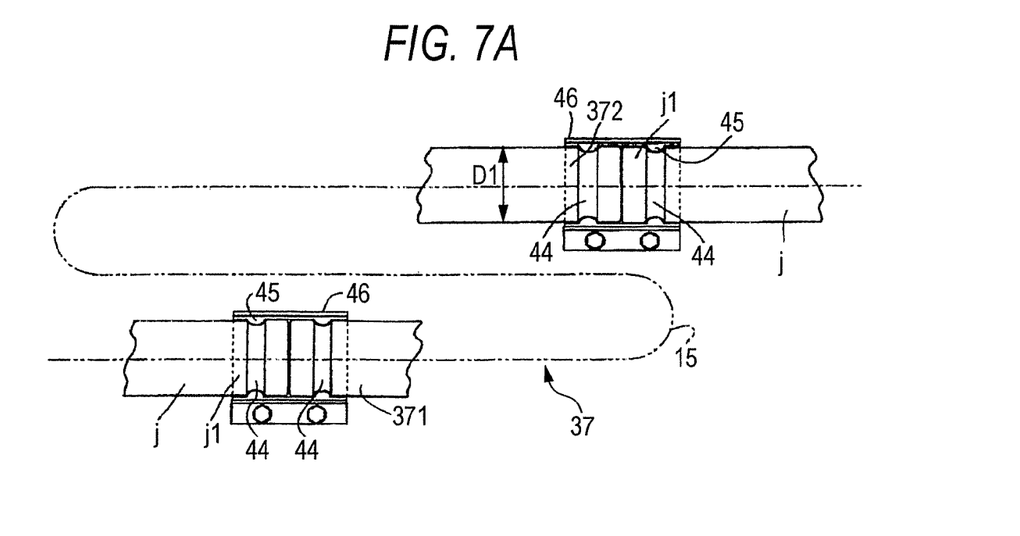

Like the finned radiation pipe 27 shown in FIG. 4C, annular recesses 44 are formed at an inflow end 371 and an outflow end 372 of the bent radiation pipe 37 as shown in FIG. 7A. Moreover, the annular recesses 44 are also formed in the abutting end portions j1 of the individual main communication units j to be brought into abutment against those ends. In the state, too, where the abutting end portions j1 of the individual main communication units j are abutting against the inflow end 371 and the outflow end 372 of the bent radiation pipe 37, the individual abutting portions are integrally fastened and jointed to each other by fastening belts 46 through sealing members 45.

Figure 7B:
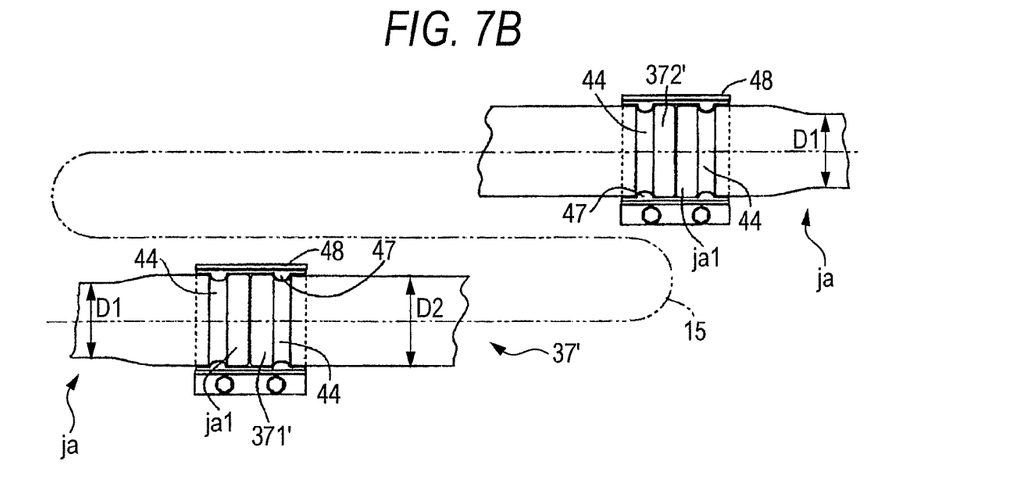
FIG. 7B is an explanatory diagram of a connection structure in another embodiment.

As shown in FIG. 7A, the bent radiation pipe 37 and the individual front and back main communication units j have the equal external diameter D1. Alternatively, however, a bent radiation pipe 371 may have a larger external diameter D2 than the external diameter D1 of the two main communication units j, as shown in FIG. 7B. In this case, the portions of a predetermined length of the diametrically enlarged abutting end portions ja1 of individual main communication units ja, as facing the inflow end 371' and the outflow end 372' of the diametrically enlarged bent radiation pipe 37', are diametrically enlarged in advance. The annular recesses 44 are individually formed in the inflow end 371' and the outflow end 372' of the diametrically enlarged bent radiation pipe 371, and the annular recesses 44 are also formed in the diametrically enlarged abutting end portions ja1 of the individual front and back main communication units j' to be brought into abutment. Moreover, the inflow end 371' and the outflow end 372' of the bent radiation pipe 37' and the diametrically enlarged abutting end portions ja1 of the individual main communication units ja being brought into abutment are fastened and jointed through sealing members 47 by relatively diametrically enlarged fastening belts 48.

Thus, the diametrically enlarged bent radiation pipe 37' has a heat radiation part relatively enlarged so that a sufficient effect for cooling the cooling water can be attained even with the simple constitution.

Figure 7C:
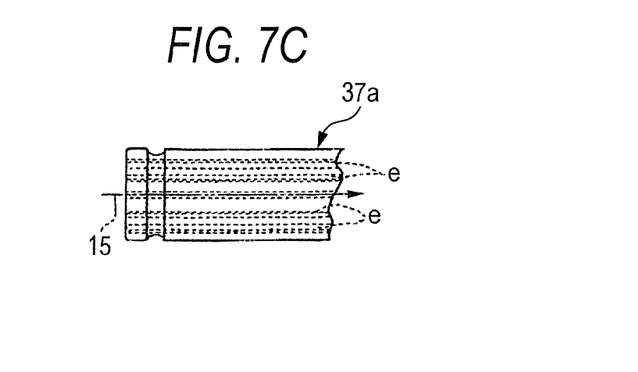
FIG. 7C is a partially cut-away side elevation of a main pipe of the bent radiation pipe in that another embodiment.

As shown in FIG. 7C, a plurality of straight ridges e may be dispersed and formed on the inner wall face of a bent radiation pipe 37a having outgoing fins, so that the ridges e absorb the heat of the cooling water thereby to promote the heat radiation more from the outer pipe surface. In this case, too, a sufficient effect for cooling the cooling water can be attained even with the simple constitution.

Figure 8:
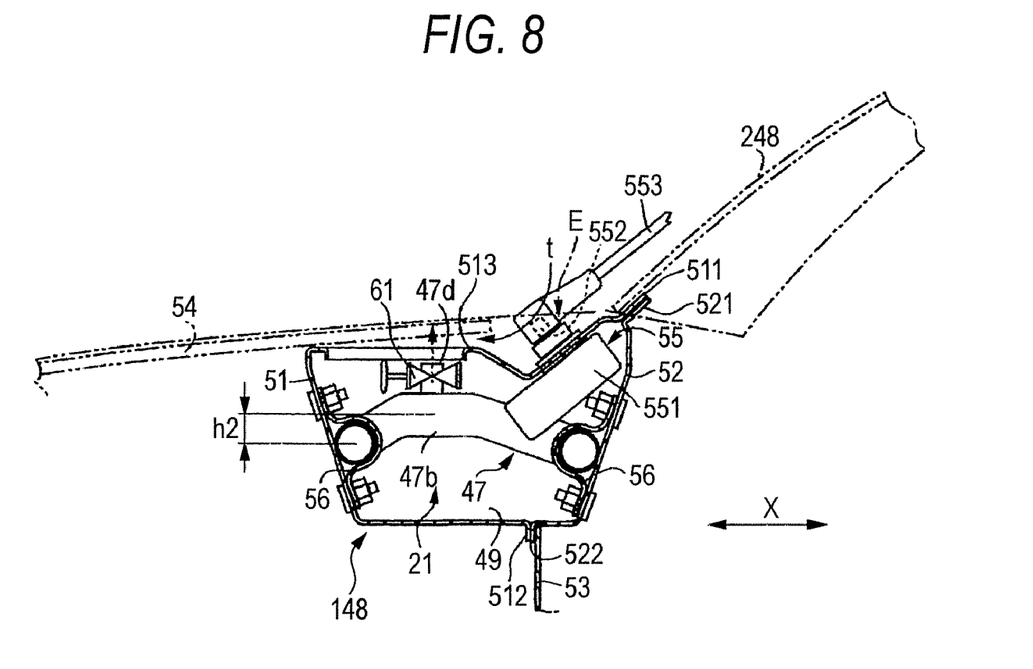
FIG. 8 is a schematic section of a deck radiation pipe and a deck portion in a deck cooling part in FIG. 1.

As shown in FIGS. 1, 2 and 8, the deck cooling part 21 in the main circulation passage 15 is formed of a deck radiation pipe 47. This deck radiation pipe 47 is arranged in such a deck space 49 in the front deck 148 as is elongated in the transverse direction Y along the lower portion of a front windshield 248 of the vehicle 1. Here, the front deck 148 lays an outer panel 51 and an inner panel 52 to form the deck space 49 long in the transverse direction Y, and thereby its structure has a generally rectangular section. Moreover, the right and left ends of the front deck 148 are integrally joined to the not-shown right and left front pillar sides so that they function to enhance the rigidity of the upper side of the front portion of the compartment. The overlapped portion of two upper flanges 511 and 521 of the outer panel 51 and the inner panel 52 forms a portion for supporting the lower end of the front windshield 248. Moreover, the overlapped portion of two lower end flanges 512 and 522 of the outer panel 51 and the inner panel 52 is integrally joined to the upper end portion of a dash panel 53 elongated in the transverse direction Y so that the front deck 148 can sufficiently function as a rigid member for the front portion of the body.

An upper wall portion 513 of the outer panel 51 of the front deck 148 is opened at a plurality of portions to introduce the ambient air into the deck space 49 so that the opened portions function as an air passage for introducing the fresh air into the not-shown air conditioner in the compartment. Here, the major portion of the upper portion 513 of the outer panel 51 of the front deck 148 is covered with the turning end side (i.e., the right side end in FIG. 8) of a front hood 54 while retaining a ventilation interspace t therebetween.

In the deck space 49, moreover, there is housed not only a drive unit 551 of a windshield wiper 55 but also a wiper turning shaft 552 and the root end portion of a wiper arm 553. At the wiper driving time, the turning motion of the root end portion of the wiper arm 553 is allowed in a space E between the front hood 54 and the lower end supporting portion of the front windshield 248.

As shown in FIG. 8, the deck space 49, as elongated in the transverse direction Y, of the front deck 148 has such a capacity as can retain a sufficient ventilation space even when it houses the bent deck radiation pipe 47. This bent deck radiation pipe 47 is arranged close to the two vertical wall faces of the outer panel 51 and the inner panel 52, and is fastened at a plurality of portions by means of fastening fittings 56 and bolts.

Here, the bent portion 47b of the bent deck radiation pipe 47 is bent upward of the other straight portion 47s by a height h2, and an air bleeding pipe 47d is protruded upward from the upper wall of the bent portion 47b. A manually operable control valve 61 is attached midway of that air bleeding pipe 47d. The air, as generated in the cooling water, relatively easily accumulates in the bent portion 47b, as located at the relatively high position, of the deck radiation pipe 47. When the cooling water circulation passage in the engine cooling system A stops, therefore, the air residing in the bent portion 47b can be discharged by opening/closing the control valve 61 at a proper time.

Thus, the deck space 49 of the front deck 148 keeps sufficient ventilation and forms the running wind flow space, in which the deck radiation pipe 47 is arranged to face. In this case, rain water may flow into or snow or the like may lie in the space E between the front hood 54 and the lower end supporting portion of the front windshield 248. However, the not-shown drain passage is formed in the low wall portion of the front deck 148 thereby to clear the deck space easily of the rain water. In case the snow lies in the space E, moreover, a fallen snow removing function to melt the snow can be exhibited by the heat radiation of the deck radiation pipe 47 forming the deck cooling part 21.

The joint structure for joining the inflow and outflow ends of the deck radiation pipe 47 in the main circulation passage 15 and the abutting end portions j1 of the main communication units j can adopt a structure like that of the case of the aforementioned bent radiation pipe 37, thus, the detailed description is omitted.

As shown in FIG. 3, the main communication unit j extending from the outflow end of the deck radiation pipe 47 reaches the incoming floor-lower-face cooling part 23 through a merging portion 156 with the heating passage 14.

As shown in FIGS. 2 and 3, the incoming floor-lower-face cooling part 23 is formed of the same finned radiation pipe 27 as that of the outgoing floor-lower-face cooling part 18, and is different only in that it is mounted at a position on the transversely opposite side of the body floor 36, thus, the detailed description is omitted. Moreover, the main communication unit j on the downstream side of the incoming floor-lower-face cooling part 23 is constituted to return to the upper and lower water jackets 9w and 11w on the body side of the engine 5 through the water pump 13.

Next, the heating passage 14 is branched at the thermostat 16 from the main circulation passage 15 but is formed of, for example, an insulated rubber hose unlike the main circulation passage 15. The heating passage 14 merges, after having passed through the heat exchanger 22 of the heater, at the merging portion 156 into the main circulation passage 15, and returns to the water pump 13 through the incoming floor-lower-face cooling part 23 of the main circulation passage 15.

Thus, the two finned radiation pipes 27 are disposed below the body floor 36 at the two front and back portions on the outgoing side and on the incoming side so that the cooling water can be reliably cooled down by receiving the running wind sufficiently on the outgoing and incoming floor-lower-face cooling parts 18 and 23.

The actions of the engine cooling system A thus constituted are described.

When the engine is in a cold running stage, in which the cooling water temperature is lower than the complete warming temperature such as 80° C., for example, at a cold starting time, the thermostat 16 blocks the cooling water flow to the heating passage 14 and the main circulation passage 15 thereby to suppress the heat radiation of the cooling water. This cooling water circulates only through the condenser tank 24 and the ATF warmer 25 of the warming promotion passage 17 of the relatively small diameter, which is always held open, thereby to warm up the engine earlier.

When the cooling water temperature exceeds the complete warming temperature such as 80° C., the thermostat 16 opens the heating passage 14 and the main circulation passage 15 thereby to circulate and feed the cooling water at a predetermined flow ratio to the two passages. As a result the heat exchanger 22 of the heater properly acts, and the heat of the cooling water can be efficiently radiated to the atmosphere at the outgoing floor-lower-face cooling part 18, the forward cooling part 19, the deck cooling part 21 and the incoming floor-lower-face cooling part 23 of the main circulation passage 15 disposed to face the running wind flow space while suppressing an excessive rise in the cooling water temperature.

Especially, the finned radiation pipes 27 in the outgoing and incoming floor-lower-face cooling parts 18 and 23 can be sufficiently large heat radiation part to exhibit the sufficient heat radiation effect. The bent radiation pipe 37 of the forward cooling part 19 can receive the running wind of a sufficient flow rate easily thereby to exhibit a sufficient heat radiation effect. The deck radiation pipe 47 of the deck cooling part 21 is arranged at the high position so that it can radiate the heat efficiently in the deck space 49 of excellent ventilation and can exhibit the fallen snow removing function. When the vehicle stops, moreover, the bent radiation pipe 37 is enabled to receive the forced cooling wind by driving the fan motor 392 on the air conditioner side thereby to exhibit the cooling effect at the stop time.

In the engine cooling system according to the embodiment, moreover, the cooling water circulation passage is composed in its entirety of the radiation pipes so that it can be far lighter than the radiator thereby to eliminate the radiator fan motor and the relative equipments, which might otherwise be needed for the radiator. As a result, it is possible to reduce the cost, and to make less the breakages due to hit stone than the radiator thereby to make less the clogging with dust. Thus, the resultant advantage is that the cooling performance is not aged. Since the entire cooling water circulation passage of the cooling system is composed of the radiation pipes, moreover, the cooling system layout, which has been impossible in the case of using the radiator, can be adopted by bending the radiation pipes into arbitrary shapes.

The foregoing description has been made on the vehicle of the rear engine type, but substantially similar advantages can be obtained even in case the engine cooling system according to the invention is applied to a vehicle of a midship type. Also the cooling system according to the embodiment of the present invention can also be applied to a vehicle of a front engine type.

The entire disclosure of Japanese Patent Application No. 2005-118844 filed on Apr. 15, 2005 including specification, claims, drawings and abstract is incorporated herein be reference in its entirety.

What is claimed is:

1. A vehicle engine cooling system, comprising:
a cooling water circulation passage extending from an engine in an engine room and returning to the engine, at least a part of the cooling water circulation passage arranged to face a running wind flow space apart from the engine room,
wherein the cooling water circulation passage includes:
a forward cooling part including a bent radiation pipe that extends in a direction substantially perpendicular to a longitudinal direction of the vehicle and disposed in a front portion of a vehicle body for receiving a running wind; and
a floor-lower-face cooling part including a finned radiation pipe and disposed on a lower face of a floor of the vehicle body for receiving the incoming wind,
wherein the cooling water circulation passage further includes:
a deck cooling part including a deck radiation pipe passing inside a deck portion of the vehicle body.

2. A vehicle engine cooling system according to claim 1, wherein the cooling water circulation passage includes a metallic radiation pipe at a portion other than at least one of the forward cooling part, the floor-lower-face cooling part and the deck cooling part.

3. A vehicle engine cooling system according to claim 1, wherein the engine room is arranged in a middle portion or in a back portion of the vehicle body.

4. A vehicle engine cooling system according to claim 1, wherein the bent radiation pipe is arranged in a front space of an air conditioner condenser arranged in a front hood room in the front portion of the vehicle body.

5. A vehicle engine cooling system according to claim 1, wherein the cooling water circulation passage includes a metallic radiation pipe at a portion other than at least one of the forward cooling part and the floor-lower-face cooling part.

6. A vehicle engine cooling system according to claim 1, wherein the floor-lower-face cooling part includes,
an outgoing floor-lower-face cooling part, provided between the engine and the forward cooling part, that cools a cooling water that flows from the engine toward the forward cooling part, and
an incoming floor-lower face cooling part, provided between the forward cooling part and the engine, that cools the cooling water that flows from the forward cooling part toward the engine.

7. A vehicle engine cooling system according to claim 1, wherein the deck cooling part is located at a position relatively higher that the forward cooling part and the floor-lower-face cooling part.

8. A vehicle engine cooling system according to claim 7, wherein the deck cooling part includes a control valve for releasing air accumulated in the cooling water circulation passage.

9. A vehicle engine cooling system according to claim 1, wherein the deck cooling part is located in a vicinity of a front windshield.

10. A vehicle engine cooling system according to claim 9, wherein the deck cooling part extends in a direction perpendicular to a longitudinal direction of the vehicle and inside a deck space provided in a front deck.

11. A vehicle engine cooling system according to claim 1, wherein the forward cooling part stands substantially upright in the front portion of the vehicle body.

* * * * *